United States Patent

Fletcher et al.

[11] 3,827,807
[45] Aug. 6, 1974

[54] STAR SCANNER

[76] Inventors: James C. Fletcher, Administrator of the National Aeronautics and Space Administration with respect to an invention by; Richard L. Gutshall, 4170 Judson Dr.; Randall T. McConaughey, 7810 Durham Way, both of Boulder, Colo.; Frank A. Volpe, 557 Beach Dr., Annapolis, Md.

[22] Filed: Sept. 29, 1972

[21] Appl. No.: 293,725

[52] U.S. Cl............... 356/141, 33/268, 250/203 R, 356/147
[51] Int. Cl. .......................................... G01b 11/26
[58] Field of Search.................... 356/141, 152, 147; 250/203 R; 33/268

[56] References Cited
UNITED STATES PATENTS

| | | | |
|---|---|---|---|
| 3,006,236 | 10/1961 | Michaud............................ | 356/147 |
| 3,290,933 | 12/1966 | Lillestrand et al.................... | 33/268 |
| 3,488,504 | 1/1970 | Lowen et al.......................... | 33/268 |

*Primary Examiner*—Malcolm F. Hubler
*Assistant Examiner*—S. C. Buczinski
*Attorney, Agent, or Firm*—R. F. Kempf; John R. Manning

[57] ABSTRACT

A star scanner on a spin stabilized spacecraft includes a reticle with a pair of slits having different separations as a function of the spacecraft vertical plane, to form a "V" slit. The time between a star image crossing one of the slits relative to a reference telemetry time provides an indication of azimuth angle. The time between the image crossing the two slits provides an indication of elevation angle of the star. If a star cluster is detected such that two stars pass the slits in less time than normally required for a single star to cross the two slits, an indication of the cluster occurrence is derived. Means are provided to prevent effective detection of large celestial bodies, such as the sun or moon.

3 Claims, 5 Drawing Figures

STAR SCANNER

ORIGIN OF THE INVENTION

1. Field of Invention

The present invention relates generally to star scanners and, more particularly, to a star scanner including a reticle with a pair of slits having differing separations.

2. BACKGROUND AND SUMMARY OF THE INVENTION

The apparatus of the present invention includes means for determining the azimuth and elevation angles of a star being scanned by an optical system on a spin stabilized spacecraft. The scanner has a "V" slit reticle including a pair of slits having a differing separation to generate two pulses in response to each star above a predetermined magnitude. As the spacecraft rotates about its axis that extends generally parallel to the longitudinal direction of the slits, images of the star cross the reticle field of view.

Generally, in the prior art, systems for determining elevation having included means for deriving a reference pulse once during each spin revolution of the spacecraft by responding to a star having a relatively fixed position, such as Polaris. Systems of this type require apparatus for viewing the fixed position star and are subject to error because spacecraft spin is not constant; typically, spacecraft spin is 30±6 rpm so that as much as a ±20 percent deviation in spacecraft spin can occur. To avoid errors that can occur because of the deviation and eliminate the requirement for a transducer responsive to the fixed body radiation, the present invention includes means for deriving azimuth information by measuring the occurrence time between a telemetry clock source and the occurrence of radiation passing through one of the reticle slits.

An additional feature of the invention is that large celestial radiating bodies are distinguished from point source, star images and large body signals are not processed. This result is attained by including electronic circuitry responding to the trailing edge of a received image and inhibiting passage of trailing edges which occur more than a predetermined time after a leading edge. The predetermined time is less than the time required for a large celestial body image to pass the reticle slit.

Another feature of the invention is that signal-to-noise ratio is increased by utilizing a discriminator that is normalized in response to the amplitude of the received star image. The result is achieved by providing a relatively short effective delay for the magnitude of a received star image and feeding a portion of the delayed signal amplitude to an amplitude comparator that is also responsive to the amplitude of received radiation. The comparator derives a finite output only in the interval while the fraction of the delayed received energy is greater than the actual magnitude of the received energy, which interval occurs only for a short time period after radiation from the detected celestial body has ceased.

The system of the present invention is subject to deriving erroneous indications of elevation position if a star cluster occurs, if the clustered stars are so close to each other that the radiation from adjacent stars passes through one slit to a photodetector in a time interval less than the time interval normally required for radiation from only one star to pass through both slits to the photodetector. To provide an indication of erroneous information arising in this manner, the present invention includes means for detecting if three pulses are derived from the photodetector within a predetermined time interval less than the maximum time required for radiation from one star to pass both reticle slits.

It is, accordingly, an object of the present invention to provide a new and improved spacecraft star scanner.

Another object of the invention is to provide a new and improved spin stabilized spacecraft star scanner utilizing a reticle that provides an accurate indication of star position and which utilizes only one star detector.

Another object of the invention is to provide a new and improved star scanner for enabling large celestial bodies to be discriminated from star images.

A further object of the invention is to provide a new and improved system for increasing signal-to-noise ratio of a radiation detector by utilizing a detected image as normalizing source.

An additional object of the invention is to provide a new and improved star scanner utilizing a "V" slit reticle and wherein erroneous results due to star clusters are indicated.

The above and still further objects, features and advantages of the present invention will become apparent upon consideration of the following detailed description of one specific embodiment thereof, especially when taken in conjunction with the accompanying drawing.

DETAILED DESCRIPTION OF THE DRAWING

Figure 1:
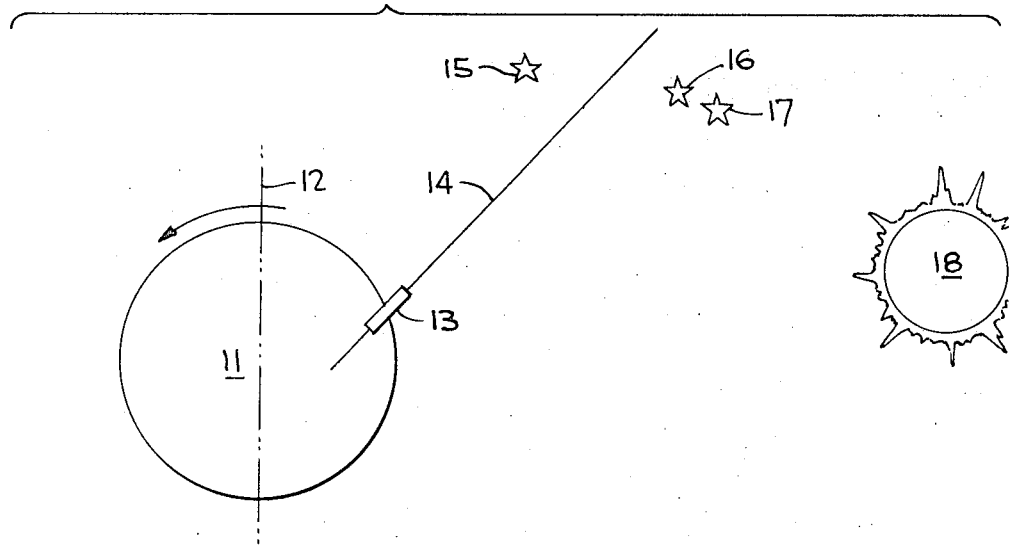
FIG. 1 is a schematic view illustrating a spinning spacecraft containing an optical system and data processing system in accordance with the present invention.

Reference is now made to FIG. 1 of the drawing wherein there is illustrated a spin stabilized spacecraft 11 which rotates at a relatively constant rate, such as 30±6 revolutions per minute, about its spin axis 12, which can be considered as a local vertical axis and which lies wholly within the spacecraft elevation plane. Positioned on spacecraft 11 is an optical system 13 having an optical axis 14 that is displaced relative to spin axis 12 and a local horizontal, i.e. azimuth, plane of the spacecraft at right angles to axis 12. As spacecraft 11 spins about axis 12, the optical system responds to light frequency electromagnetic wave radiation propagating on axis 14, as emitted by celestial bodies, such as derived from a single point source, star 15, from clustered point sources, stars 16 and 17, and from an apparently larger body 18, which may be the sun or moon.

Electronics included within spacecraft 11 derives information indicative of the elevation and azimuth angle of star 15, provides an indication that meaningful elevation and azimuth information cannot be derived regarding the position of clustered stars 16 and 17, and provides no information regarding body 18. A ground station responds to signal indicative of the derived information and indication, as telemetered from the spacecraft to provide an indication of the spacecraft orientation.

Figure 2:
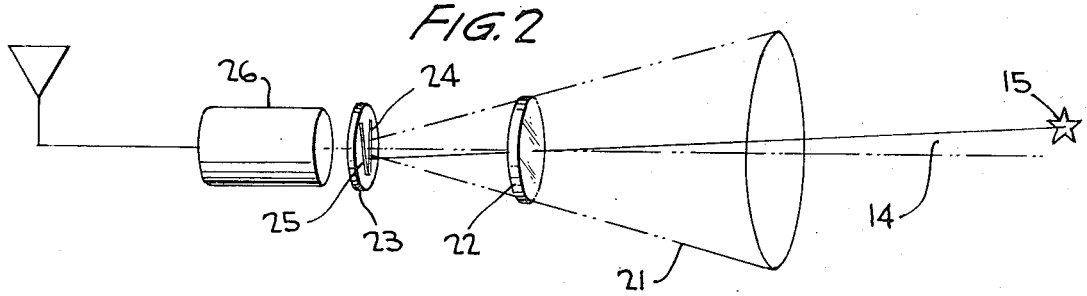
FIG. 2 is a schematic diagram of the optical system included in the spacecraft of FIG. 1.

A schematic diagram of the optical system, in combination with a radiant energy to electrical transducer, is illustrated in FIG. 2. Lying along optical axis 14 and coaxial therewith is conically shaped light shield 21, within which is located focusing lens system 22. Light from a distant image, such as star 15 is focused by lens system 22 on a quartz reticle 23, that passes light through a pair of slits 24 and 25 to a photomultiplier tube 26. Reticle 23 is positioned in proximity to the focal plane of 22 so that light passing through a pinhole at the focal plane irradiates the reticle, which selectively passes it to photomultiplying light energy to electric signal transducer 26. Optical axis 14, in one configuration of the system, is set at an angle of approximately 37 degrees below the rotation plane of spacecraft 11 and has a field of view of approximately 10° in elevation plane of the spacecraft, and of 5° in the azimuth plane.

Figure 3:
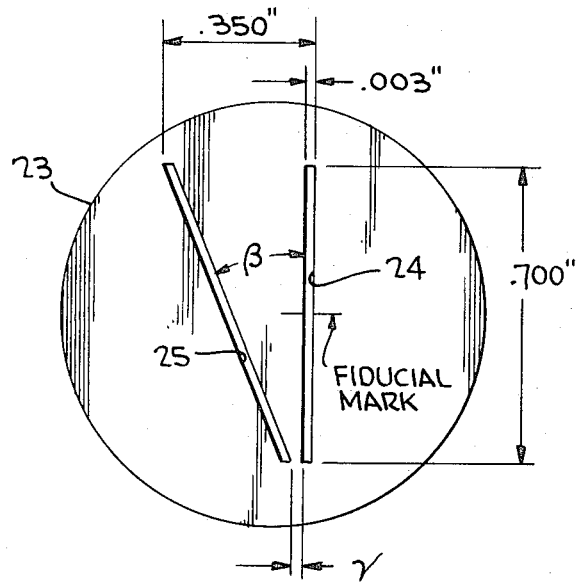
FIG. 3 is a plan view of one embodiment of a reticle included in the optical system.

Reticle 23 preferably has a configuration, in plan view, as illustrated in FIG. 3. In particular, the reticle is formed of an opaque quartz material that has transparent, straight line "V" slits or fiducial lines 24 and 25 formed therein so that slit 24 is parallel to the spacecraft vertical axis and slit 25 is inclined to the vertical axis. The separation between slits 24 and 25 varies as a function of the vertical position of the slits from axis 14. The vertical extent of slits 24 and 25, in one particular configuration, is approximately 0.7 inches and the maximum separation between the slits is approximately 0.35 inches, with a minimum separation of approximately 0.03 inches. The reticle slits are selected to provide maximum signal-to-noise ratio, a result that is achieved by designing the slit width and lens system 22 such that when the star is in the center of the slit its image extends from one edge of the slit to the other edge and does not extend beyond the slit edges; in one configuration each slit has a width of approximately 0.003 inches. If the slits were smaller the amount of light passing through them would be decreased to cause a decrease of the amplitude of derived signal pulses. If the slot width were increased the star image would be smaller than the slot width so that there is a higher probability of stray light passing through the slits.

As the optical axis 14 sweeps past a star, such as star 15, photomultiplier tube 26 generates a separate pulse in response to light energy from the detected star passing through each of slits 24 and 25. The crossing time of vertical slit 25 relative to an internally generated clock pulse is proportional to the azimuth angle of the star, while the elapsed time between the star image crossing from slit 24 to slit 25 is proportional to the elevation angle of the star. Each star viewed by optical system 13 thereby produces a characteristic "signature" indicative of the position of the star relative to the spacecraft orientation. Because of the inclination of slit 25 relative to slit 24, the time between the star optical image crossing slits 24 and 25 provides an indication of the vertical position of the star. For example, those stars which cross near the bottom of the V, where slits 24 and 25 are closest to each other, take a shorter time to cross the slits than those near the top of the V, where the slits are spaced farther apart. The star crossing times are measured by electronic means, described infra, and transmitted as digital signals via a telemetry link to a ground station. By utilizing a clock source to measure the image crossing time of slits 24, rather than an indication of the spacecraft passing a reference point and measuring the time from the reference point to the crossing time of the image relative to slit 24, greater accuracy is provided and data are more easily assembled in the transmitted telemetry format, as discussed infra. These results occur because the spacecraft spin velocity is not precisely fixed, but varies over a range of 30±6 revolutions per minute. In addition, the use of an internal clock, rather than a sensor, to derive time reference pulses, reduces the system requirement expenses, since a further transducer is not required to generate an indication of the reference point crossing time.

Figure 4:
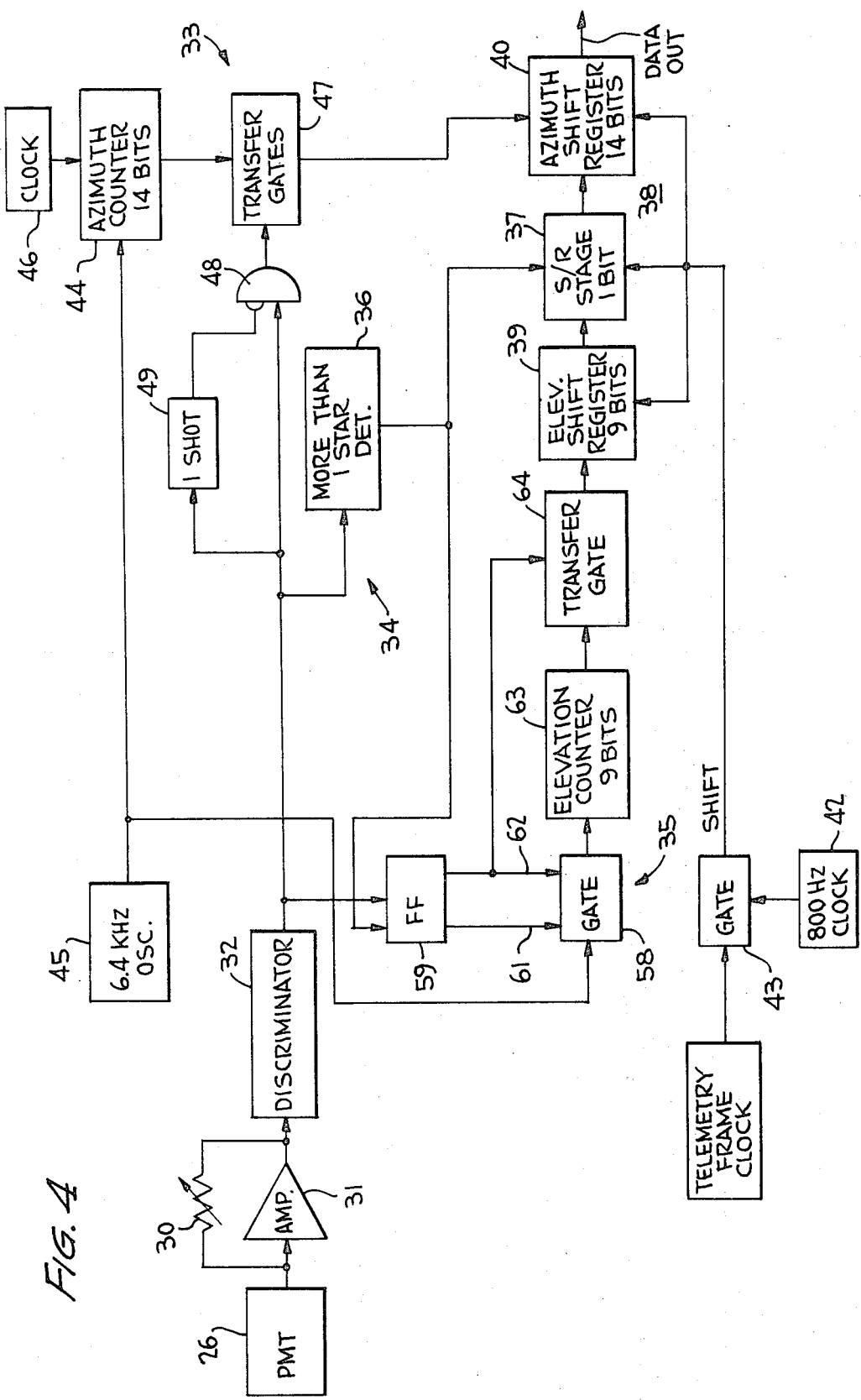
FIG. 4 is a block diagram of the data processing apparatus in the spacecraft.

Reference is now made to FIG. 4 of the drawing wherein there is illustrated a circuit diagram of data processing apparatus included in the present invention. The output of photomultiplier tube 26 is applied to a variable gain amplifier 31, including a variable feedback resistor 30 the value of which controls the amplifier gain and is set at one of several values depending upon the magnitude of the stars being scanned. The output of amplifier 31 is fed to discriminator 32, which derives an output signal in response to the trailing edge of a star detected by photomultiplier tube 26, provided the star has an intensity above a predetermined level, such as the intensity associated with a +3 magnitude star. Discriminator 32 also includes means for deriving star indicating output signals only in response to point sources, such as stars 15, 16, and 17; thereby, in response to the optical axis 14 crossing relatively large celestrial body 18, not output signal is derived from discriminator 32.

The signal derived from discriminator 32 is applied in parallel to three channels 33, 34, and 35. Channels 33 and 35 respectively enable the azimuth and elevation angles of a detected point source to be determined, and channel 34 derives an output signal indicative of a cluster of stars 16 and 17 being detected. With the reticle of FIG. 3, a star cluster may provide erroneous information if the cluster has adjacent stars which are detected by photomultiplier tube 26 within the maximum time required for a single star to cross both reticles, which is typically 50 milliseconds. In response to photomultiplier tube 26 deriving three or more adjacent pulses within the 50 millisecond interval, more than one star detector 36, included within channel 34, and described infra, derives a binary one signal to provide an indication that a star cluster has been detected and that azimuth and elevation angle information derived as a result of the star cluster radiation crossing the reticle does not provide independent data. The binary one signal derived from detector 36 is fed to one stage section 37 of a 24 stage shift register 38, where information is stored and read out periodically in response to telemetry command signals.

Shift register 38 includes second and third sections 39 and 40 respectively having nine and 14 stages for storing information regarding the elevation and azimuth angles of the detected star. The data stored in shift register 38 are periodically read out as a series bit train under control of a clock source 42, which typically has a frequency of 800 Hertz. Pulses from clock source 42 are fed in parallel to the 24 stages of shift register 38 by opening gate 43 for 24 bit times twice during each line of a telemetry frame transmitted from the spacecraft to a ground station. Each telemetry frame typically includes 48 lines having 32 eight bit words so that the azimuth, elevation, and cluster bit use three consecutive words at two approximately equally displaced time slots in each line.

The azimuth indicating signal supplied to shift register section 40 is derived by providing a 14 bit recirculating binary counter 44 which is responsive to a relatively high frequency signal derived from 6.4 KHz oscillator 45, which is synchronized with the 800 Hertz source 42. Counter 44 is reset once every telemetry frame in response to a signal derived from frame sync oscillator 46. Counter 44 thereby stores, at any time, an indication of the time relative to the beginning of a telemetry frame. To monitor azimuth angle, the frame time indicating signal stored in counter 44 is shifted through transfer gates 47 in response to a star image crossing slits 24. However, if a star image crosses slit 25 after having crossed slit 24, transfer gates 47 are not activated in response to the crossing of slit 25. Thereby, shift register section 40 stores only azimuth indications resulting from images crossing slit 24 and is unresponsive to the following image crossings past slit 25.

To feed the contents of counter 44 to section 40, transfer gates 47 include one gate between each of the stages of the counter and corresponding stages of shift register section 40, i.e., 14 gates are provided in transfer gates 47. In response to radiation passing through slit 24, the output of discriminator 32 is fed through inhibit gate 48 to enable each of the transfer gates. Inhibit gate 48 is disabled to prevent passage of signals from discriminators 32 in the interval between the crossing of an image past slit 24 and the maximum time for the image to cross slit 25. To this end, the output of discriminator 32 is fed to one shot circuit 49, which derives a binary one value for the maximum duration between the time required for an image to cross from slit 24 to slit 25. The binary one level derived by circuit 49 is fed to the inhibit input of gate 48 to prevent output signals of discriminators 32 from being fed to transfer gates 47. With gates 47 enabled, the time indicating count stored in counter 44 is fed through the gates to the respective stages of shift register section 40.

To derive an indication of the time between adjacent crossings of a star image past slits 24 and 25, pulses from oscillator 45 are fed through gate 58 during the time interval from the trailing edge of photomultiplier tube 26 responding to energy passed through slit 24 to the time when the photomultiplier tube trailing edge occurs in response to star energy passing slit 25. To this end, the output of discriminator 32 is fed to a toggle input terminal of flipflop 59, which includes complementary outputs on leads 61 and 62 that are fed to gate 58. Gate 58 responds to the complementary outputs of flipflop 59 so that in response to the flipflop being in a binary zero state, as indicated by a non-zero voltage on lead 61 to the exclusion of lead 62, gate 58 is closed; in response to flipflop 59 being in a set state, whereby a non-zero signal is derived on lead 62 to the exclusion of lead 61, gate 58 is open so that clock pulses from oscillator 45 can be fed to nine-stage recirculating binary elevation counter 63.

To enable gate 58 to be correctly set if a star cluster is detected, as indicated by a binary one output of more than one star detector 36, the output of detector 36 is applied to a reset input of flipflop 59. In response to a binary one signal being applied to the reset input of flipflop 59, the flipflop is activated so that a binary one signal is derived from it on lead 61 to close gate 58. Thereby, in response to the next pulse being derived by discriminator 32, which is indicative of a star image passing through slit 24, flipflop 59 is activated so that a binary one signal is derived from oscillator 45 until gate 58 closes.

The time indicating count stored in counter 63 is transferred to shift register 39 via transfer gates 64 in response to the elevation counter no longer receiving pulses from clock oscillator 45. To this end, transfer gates 64, one of which is provided between each of the stages of counter 63 and the like numbered stages of shift register 39, are activated in response to the trailing edge of the voltage on lead 62. In response to transfer gates 64 being open, the count stored in counter 63 is fed into the corresponding stages of shift register 39.

As indicated supra, twice during each telemetry line, at approximately equally displaced time intervals, the signals stored in shift register stages 37, 39, and 40 are read out in sequence to a telemetry transmitter in response to shift pulses being applied to the register stages through gate 43. Thereby, if a star position has been detected, its azimuth and elevation are indicated by the sequentially derived bits read out of stages 39 and 40. If a star cluster, which cannot supply independent data regarding the elevation angle of the stars, is detected within the interval, a binary one bit is derived in the bit stream at the location corresponding with stage 37.

Figure 5:
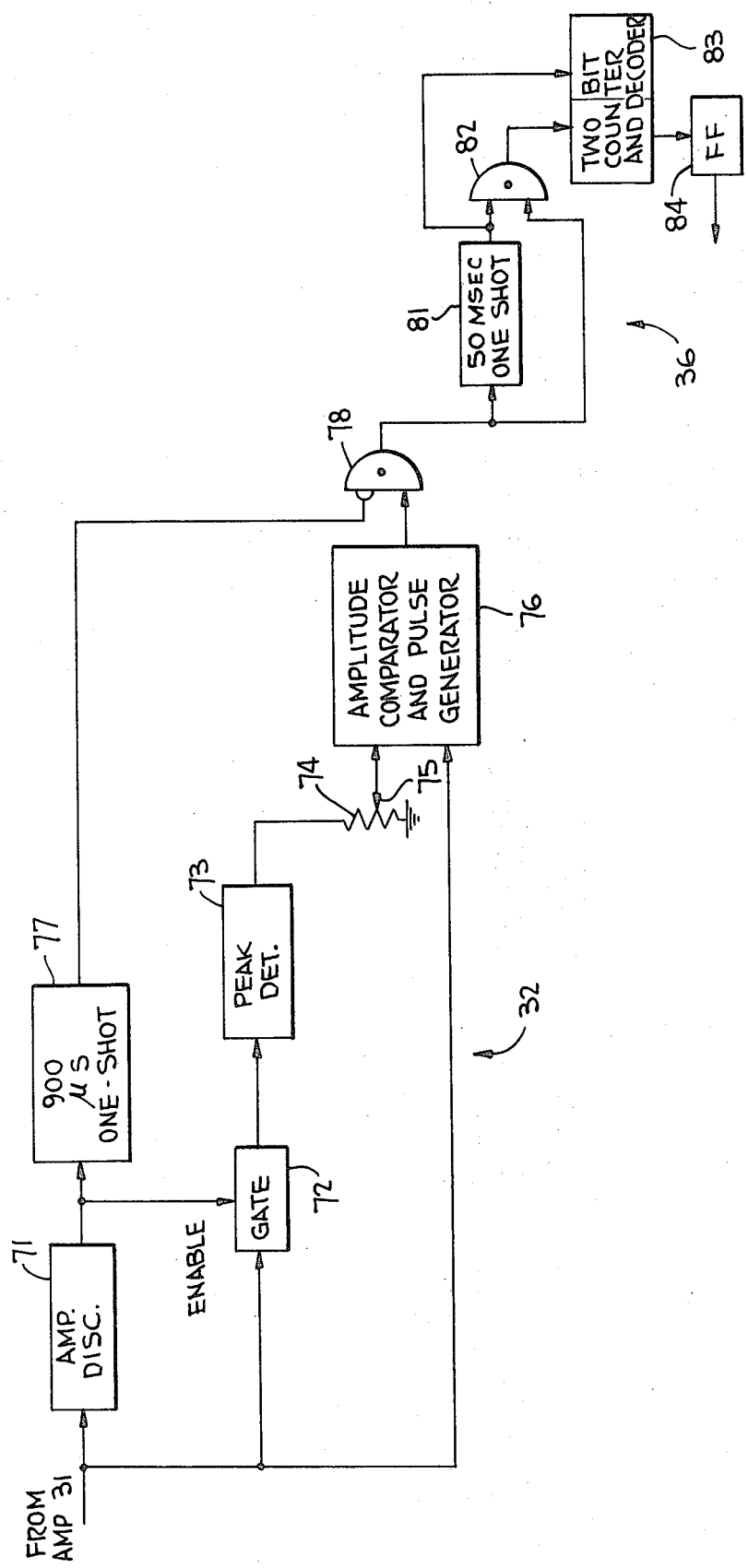
FIG. 5 is a more detailed block diagram of the discriminator and more than one star detector of the FIG. 4 block diagram.

Reference is now made to FIG. 5 of the drawing wherein there is illustrated a more detailed block diagram of the apparatus included within discriminator 32 and more than one star detector 36.

Discriminator 32 is characterized by its ability to distinguish large body 18 from point sources, such as stars 15–17. Further, the discriminator includes means for normalizing the system response as a function of the magnitude of the radiation intensity from a detected star. The discriminator also includes means for discriminating against stars that have a relatively low intensity, to increase signal to noise ratio. Typically, only stars having a brightness of greater than +3 are detected.

To these ends, star image pulses derived from amplifier 31 are supplied to an amplitude discriminator 71, which derives a binary one output only in response to light radiation exceeding a predetermined magnitude, such as associated with stars having intensities greater than a +3 magnitude. The output of amplitude discriminator 71 subsists only as long as the star image is being detected.

The output of discriminator 71 is applied as an enable input to gate 72 which passes the output of amplifier 31 as long as the discriminator is deriving a binary one level. Thereby, the output of gate 72 is a replica of the output of photomultiplier tube 26 for the time duration while the photomultiplier tube is detecting a star having an intensity associated with at least +3 magnitude stars.

The output of gate 72 is applied to peak detector 73 which immediately derives an output signal equal to the amplitude of the output of gate 72. After gate 72 is disabled, peak detector 73 maintains its output for an interval sufficiently long to enable electronic circuitry responsive to the peak detector output to respond to a change in the photomultiplier tube output, but for a time interval that is relatively short compared to the time required for a star image to pass from slit 24 to slit 25. Typically, peak detector 73 derives an output for approximately 10 microseconds after gate 72 has been disabled.

The output of peak detector 73 is applied to a voltage divider network, illustrated as potentiometer 74 having a slider 75. Thereby, the amplitude of the peak detector 73 is attenuated by a predetermined amount, typically 50 percent. The attenuated output of peak detector 73 is compared with the output of amplifier 31 in amplitude comparator and pulse generator 76. Amplitude comparator and pulse generator 76 derives a pulse having a predetermined duration and amplitude in response to the signal on slider 75 being greater than the signal derived from amplifier 31. The signal on slider 75 can exceed the output of amplifier 31 only for the 10 microsecond duration immediately following disabling of gate 72, i.e., for the 10 microseconds after the trailing edge of a pulse being derived by photomultiplier tube 26. Because the comparison input to comparator 76 derived from slider 75 is dependent upon the amplitude of the light intensity of the received radiation image, the system is provided with a normalized reference and low intensity noise signals derived from tube 26 which cannot produce false indications of celestial bodies being detected.

The output of amplitude comparator and pulse generator 76 is coupled to the remainder of the circuitry only if the pulse generator derives a signal in response to a star image being detected, to the exclusion of a large body being detected. To this end, 900 microsecond one shot circuit 77 and AND gate 78 are provided. One shot circuit 77 is responsive to the leading edge of the output of amplitude discriminator 71 and derives a voltage level for 900 microseconds in response to the leading edge. The 900 microseconds pulse has a time duration greater than the time duration required for a star image to cross either of slits 24 or 25, but less than the time duration of a large celestial body radiation image to cross the slits. Since the one shot circuit 77 is responsive only to the leading edge of the output of amplitude discriminator 71, the one shot circuit derives a binary one level for a time interval greater than the time required for a star image to pass either of slits 24 and 25, but less than the time interval required for a large body image to pass either slit. The binary one output of one shot circuit 77 is applied as an enable input to AND gate 78, the other input of which is responsive to the pulse output of amplitude comparator and pulse generator 76. Since amplitude comparator and pulse generator 76 effectively responds to the trailing edge of a radiation image detected by photomultiplier tube 26, which is the only time when the voltage on slider 75 exceeds the output voltage of amplifier 31, the output of the pulse generator 76 is fed through the AND gate 78 only if a star image is detected to the exclusion of a large body image.

The star image output of AND gate 78 is fed to more than one star detector 36. Basically, more than one star detector 36 includes circuitry for indicating if more than two star images are detected by photomultiplier tube 26 in a time period less than the maximum period required for a single star to pass between slits 24 and 25, a time duration typically set to equal 50 milliseconds.

To these ends, the output of AND gate 78 is applied in parallel to input terminals of 50 millisecond one shot circuit 81 and AND gate 82. In response to an output of AND gate 78, one shot circuit 81 derives a binary one level having a duration of 50 milliseconds. The output of one shot circuit 81 is applied as an enable input to AND gate 82, so that the AND gate derives a pulse in response to each pulse output of AND gate 78 during the 50 millisecond interval while one shot 81 is deriving a binary one level.

To detect if a pulse is derived by AND gate 82 during the 50 millisecond period while one shot circuit 81 is activated, the output pulse of AND gate 82 is used to increment the two-bit counter and decoder 83. In response to three pulses being derived by AND gate 82, flipflop 84 is activated to the set state by the output of the two-bit counter and decoder 83, which indicates that three pulses were derived from photomultiplier tube 26 within a 50 milliseconds interval, which in turn is indicative of a star cluster. The set state of flipflop 84 is derived as the output of more than one star detector 36 which is applied in parallel to shift register stage 37 and the reset input of flipflop 59.

If more than three star pulses are detected within the 50 millisecond interval while one shot 81 is in the binary one state, additional pulses are applied to the two-bit counter and decoder 83 but the state of flipflop 84 is not changed. The two-bit counter and decoder 83, however, is reset after the 50 millisecond interval has been completed by connecting the output of one shot circuit 81 to a reset input terminal of two-bit counter and decoder 83. The reset input terminal of two-bit counter and decoder 83 responds only to the trailing edge of the output of one shot circuit 81, whereby the two-bit counter and decoder is restored to its initial condition so that it can be utilized again to indicate the occurrence of a star cluster.

While there has been described and illustrated one specific embodiment of the invention, it will be clear that variations in the details of the embodiment specifically illustrated and described may be made without departing from the true spirit and scope of the invention as defined in the appended claims.

I claim:

1. A system for telemetering azimuth and elevation signals from a spacecraft spinning at a relatively constant angular velocity about a spacecraft vertical axis comprising an optical system having a relatively narrow field of view and an optical axis displaced from the spacecraft axis and a spacecraft horizontal plane whereby star images cross the optical field of view as the spacecraft rotates, transducer means responsive to the star images in the field of view for deriving an electrical signal in response to a star image impinging thereon, said optical system including a reticle having a pair of fiducial lines which are relatively oriented so that the rotation angle required for a star to cross from one fiducial line to the other is a function of star elevation angle, a telemetry frame clock source independent of the spin velocity, means responsive to the frame clock source and the electric signal for deriving a first digital signal indicative of the time between the beginning of each clock frame and the time each star image crosses a first of the lines, means responsive to the electric signal for deriving a second digital signal indicative of the time between adjacent occurrences of a star image crossing from the first line to the other line, said first and second digital signals being indicative of star azimuth and elevation angles, means responsive to the electric signal for deriving a digital indication that three or more star images occurred in less than a predetermined interval, said predetermined interval being substantially equal to the maximum time for only one star to cross between the lines, said digital indication thereby indicating a star cluster being detected, means for combining said digital indication with the first and second digital signals, and means for reading out the resulting digital signals.

2. The system of claim 1 wherein the body of said reticle is opaque and said lines are transparent to radiant energy from optical images.

3. The system of claim 2 wherein the electric signal deriving means includes means for deriving a replica of radiant energy for optical images impinging on the transducer means, said replica having leading and trailing edges occurring at the beginning and end of the period when an optical image crosses a fiducial line, means responsive to the trailing edge of the signal occurring only within a predetermined time after the leading edge for indicating a star image impinging on the transducer means, said predetermined time being greater than the time required for a star image to impinge on the transducer means, and less than the time required for a large image to impinge on the transducer means.

* * * * *